INVENTORS:
Stanley E. Shields
Philip W. Dewey

Jan. 10, 1961 S. E. SHIELDS ET AL 2,967,450
OPTICAL BUBBLE FLOWMETER
Filed Jan. 30, 1957 4 Sheets-Sheet 3
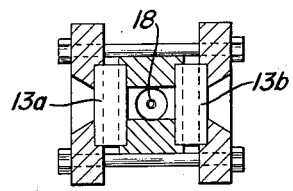
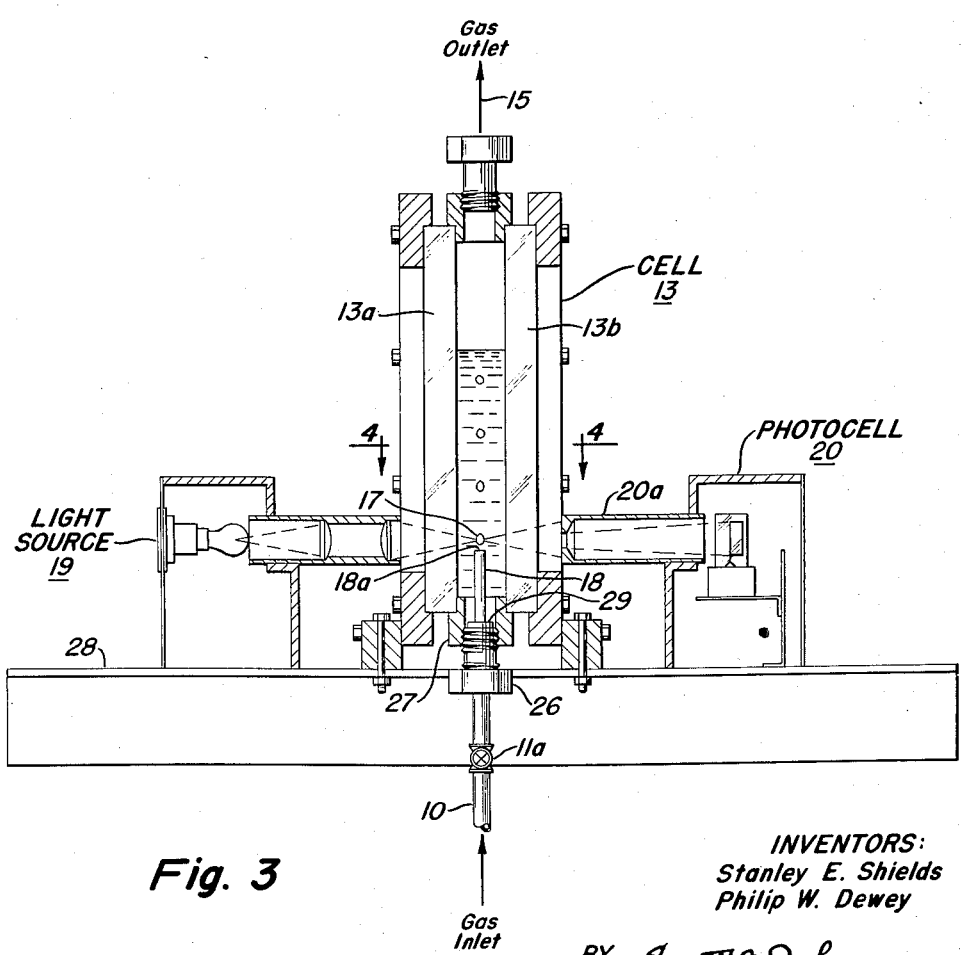
INVENTORS:
Stanley E. Shields
Philip W. Dewey
BY Everett A. Johnson
ATTORNEY

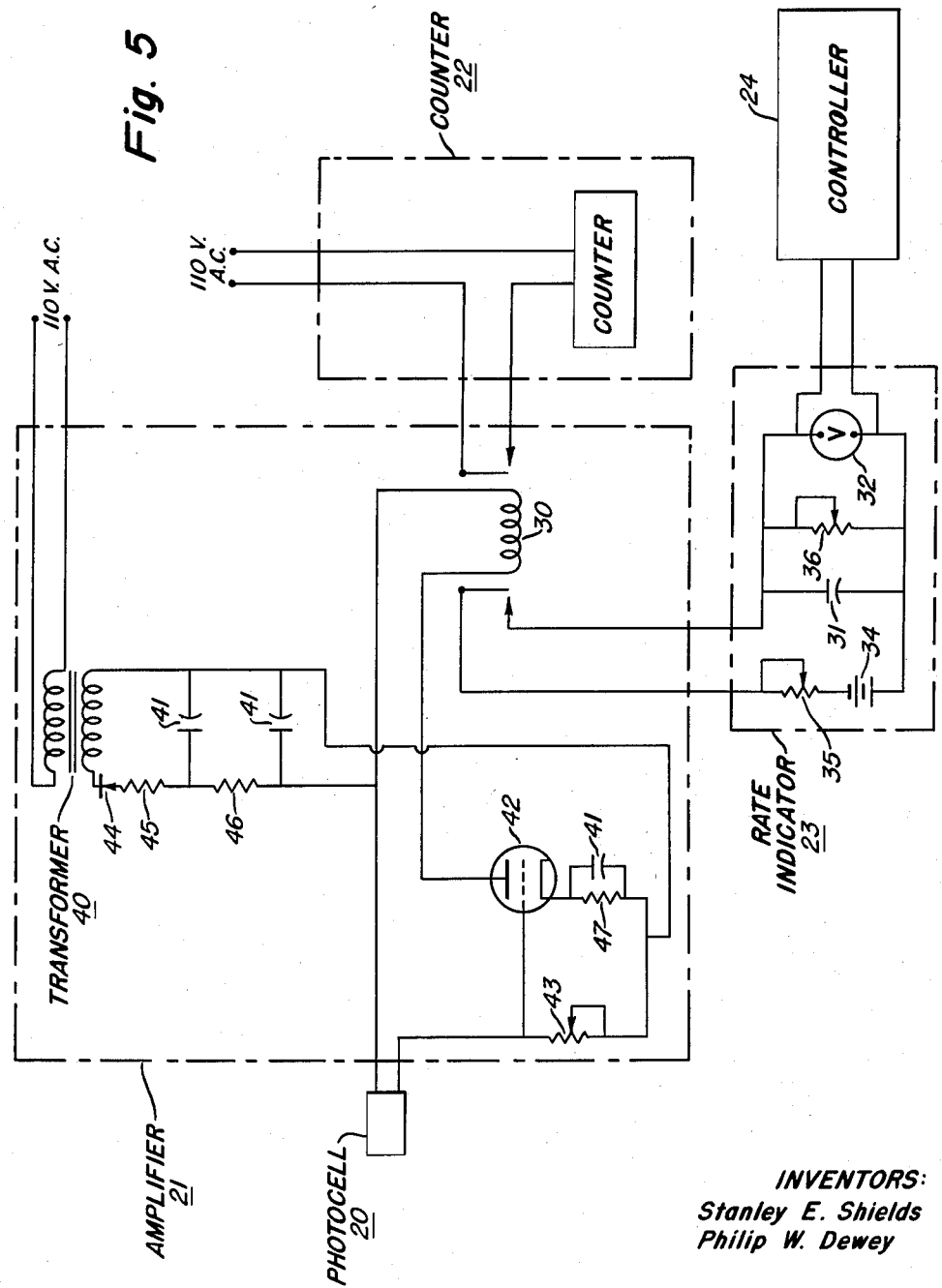

United States Patent Office 2,967,450
Patented Jan. 10, 1961

2,967,450

OPTICAL BUBBLE FLOWMETER

Stanley E. Shields, Whiting, and Philip W. Dewey, Munster, Ind., assignors to Standard Oil Company, Chicago, Ill., a corporation of Indiana Filed Jan. 30, 1957, Ser. No. 637,145

1 Claim. (Cl. 88—14)

This invention relates to a device for measuring small gas flows. More particularly, the invention relates to a flowmeter of a type which counts gas bubbles via a photosensitive apparatus.

Heretofore, many types of flowmeters have been proposed, none of which has been entirely suitable for the measurement of relatively small gas flows. Accordingly, it is a primary object of this invention to provide such a device. It is a further object of the invention to provide an apparatus which is accurate under the prescribed conditions and includes means for remote indication, recording, integration and controlling of a gaseous flow. Other objects and advantages of the invention will become apparent as the description thereof proceeds.

Briefly, according to our invention, gas in the form of discreet bubbles issues from a nozzle submerged in a liquid, the bubbles being detected photoelectrically and registered on a totalizing counter. Each bubble scatters white light emitted from a light source so as to reduce the amount of radiant energy falling on a photocell. The output of the photocell and its associated amplifier is impressed on an electronic pulse counter, each bubble registering as a separate unit. The bubble rate may also be indicated by a rate meter.

For the purpose of illustrating the invention, there is shown in the accompanying drawings one preferred form, this embodiment having been found in practice to give satisfactory and reliable results.

Referring to the accompanying drawings in which like reference characters indicate like parts throughout:

Figure 3 is an elevation, partly in section, of the counter cell;

Figure 4 is a section taken along the line 4—4 in Figure 3; and

Figure 5 is a diagram illustrating an electrical circuit employed with the assembly in Figure 2.

Figure 1:
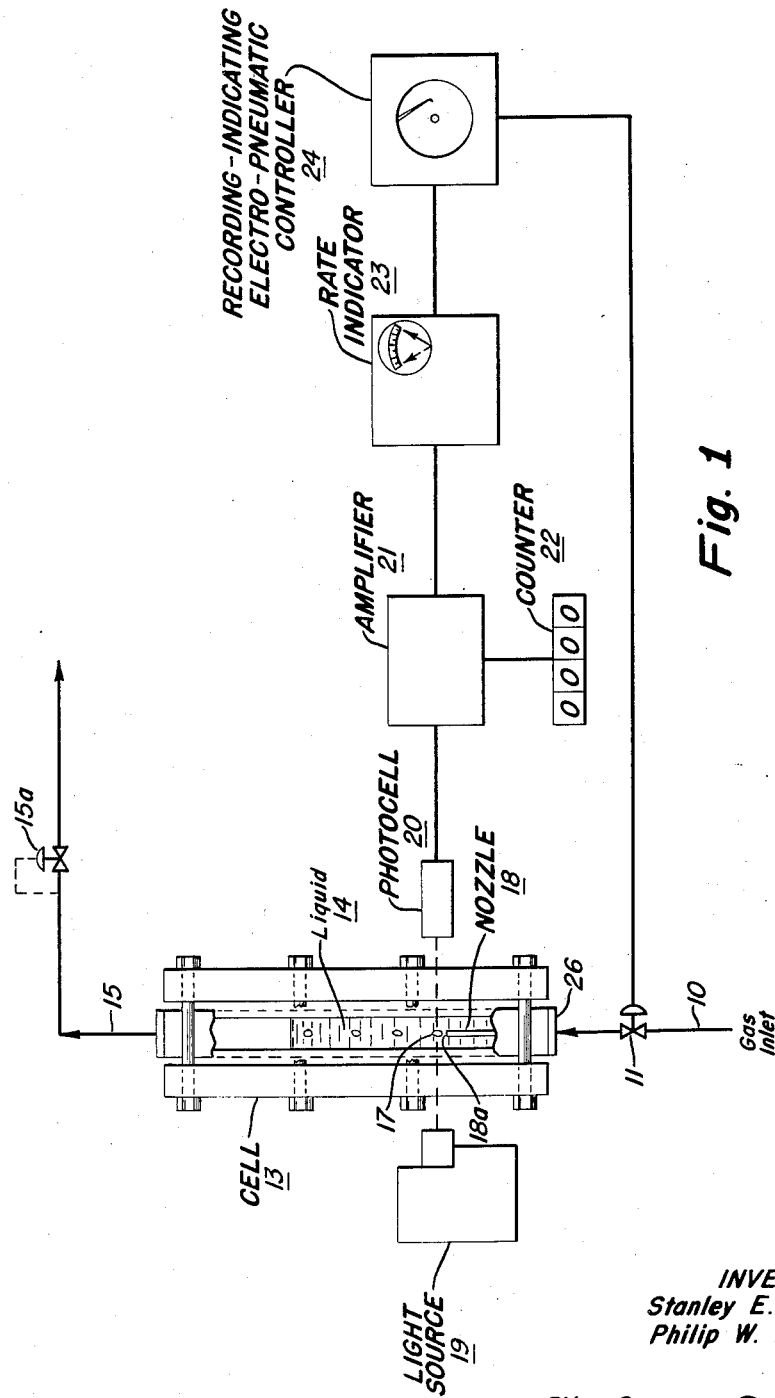
Figure 1 represents a schematic diagram of the complete flowmeter assembly for the automatic control of the gas flow.
Figure 2:
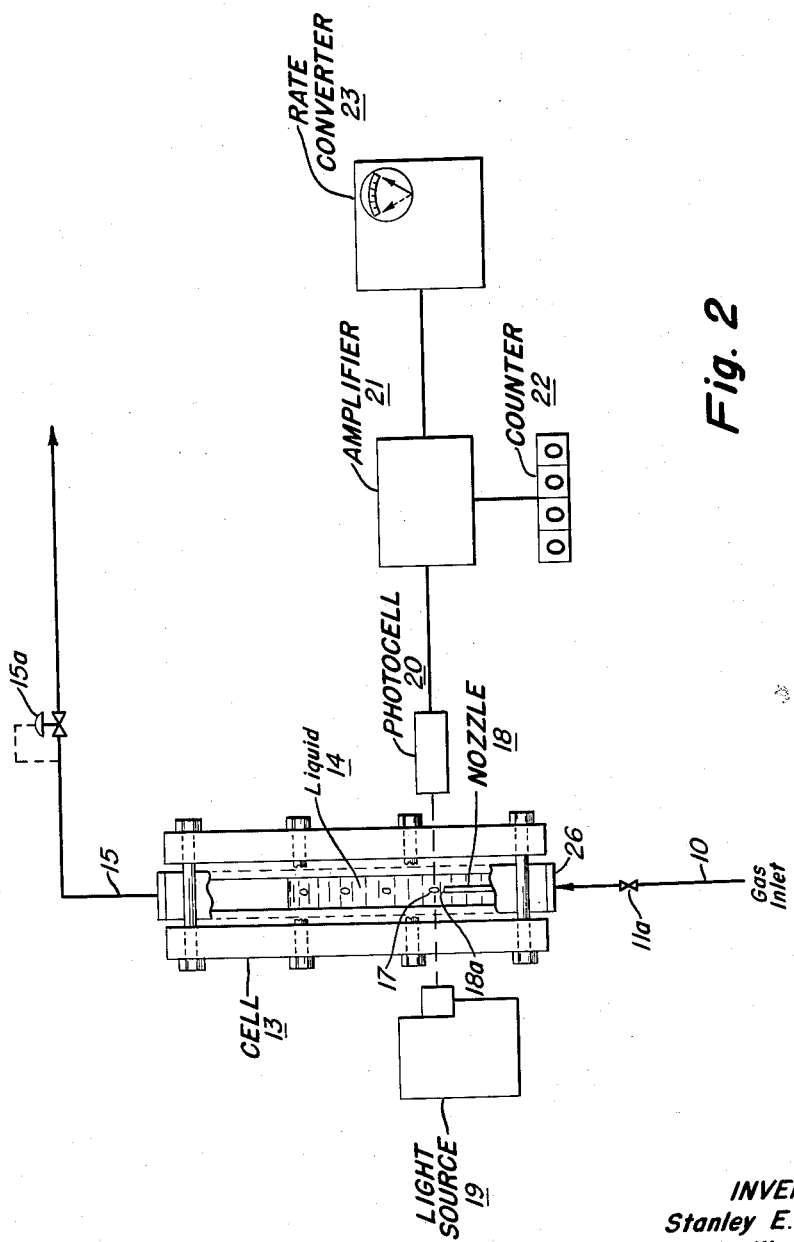
Figure 2 illustrates another flowmeter assembly for manual control of the gas flow.

In the drawings, the gas is supplied from line 10 through throttling valve 11 or 11a to the nozzle 18 extending into the bubble flowmeter cell 12. The throttle valve 11 or 11a is used to set the flow rate to the required value. Valve 11a in Figure 2 is set and adjusted manually as required to maintain the desired flow rate whereas valve 11 in Figure 1 is positioned automatically by the controller 24 to maintain the predetermined flow rate.

The windowed cell 13 contains a transparent liquid 14 through which the bubbles of gas pass upwardly and are removed from the cell 13 by gas line 15. Back-pressure control valve 15a in line 15 maintains the cell 13 at somewhat higher pressure than the vessel into which the gas discharges. With regard to the size of the cell 13, in general it is preferred that it be of minimum volume so as to avoid large holdup in the system. It is, of course, constructed to withstand the desired operating pressure.

Typical confining liquids 14 for use in cell 13 are glycerine, naphtha, water and dibutylphthalate, the latter being particularly useful due to its extremely low vapor pressure.

The liquid 14 is also chosen to be compatible with the process so that any entrainment from the cell 13 will not interfere with the ultimate use of the gas, the flow rate of which is being measured. For example, with a reaction sensitive to water vapor, water is not used as a liquid since it can be vaporized and/or carried over in the gas. It would be preferred in such an instance to use a portion of the oil charged to the process as a confining liquid if such oil was sufficiently transparent.

The bubbles 17 are detected photoelectrically at the tip of nozzle 18 by means of the light source 19 and photocell 20. The white light source 19 should be focused so it is scattered by the bubbles as they discharge from the orifice 18a. Thus, the light beam from the light source 19, directed toward the photocell 20, should traverse immediately above the orifice 18a of the nozzle 18.

The output of the photocell 20 is fed to the amplifier 21 which in turn controls the totalizing counter 22. A signal is also fed from the amplifier to the rate converter 23 which converts counter pulses into a D.C. E.M.F. which in turn is supplied to an electro-pneumatic or an electric controller 24 which actuates the pneumatic or electric control valve 11 on line 10.

In Figure 1, the control valve 11 is actuated by indicating/recording rate controller 24. The control valve 11 can be either pneumatic or electric. If a pneumatically-actuated valve 11 is used, the controller 24 is of an electro-pneumatic type, that is, a controller which operates with an electric input signal and with an air output signal. On the other hand, controller 24 may be an electric controller, that is, a controller with electric input and output signals in which case valve 11 is electrically operated. An air-operated valve with an electro-pneumatic positioner also could be used. In any event, those skilled in this art can provide the proper valve 11 and controller 24.

Back pressure control valve 15a may be provided on line 15 (in both Figures 1 and 2) to hold a higher pressure on the look-box 13 than downstream in the process. This assures accurate metering in the event of pressure changes in line 15.

Referring to Figure 3, the inlet 10 comprises an externally threaded coupling 26 adapted to be threaded into the lower end 27 of the cell 13. A nozzle 18 comprises a 0.25 inch O.D. tube which extends about 1.5 inches into the cell 13. The tip of the nozzle 18 or the discharge orifice 18a has an I.D. of about 3/32 inch. The lower end of the nozzle 29 is coupled to the gas inlet line 10 and the upper end of the cell 13 is provided with pipe coupling means for connection to the gas outlet line 15.

Counter cell 13 and the light source 19 are fixed to the support 28. The light source 19 is directed through windows 13a and 13b of the transparent cell assembly 13 onto the photocell 20 properly oriented with respect to light source 19 and is connected in the electrical circuit shown in Figure 5. The assembly includes a tubular light shield 20a disposed in contact with the window 13b of the guage 13.

The meter described and illustrated in some detail by Figures 3 and 4 is most accurate in the so-called "static flow" region in which bubble volume is independent of bubble frequency. Static flow occurs at relatively low frequencies in the range up to about 250 bubbles per minute. The meter also performs reliably in the so-called "dynamic-region" in which bubble volume depends on bubble frequency. However the meter is less accurate in the dynamic than the static regions for totalizing gas input when wide variations in flow occur.

In Figure 5, the circuit details of the amplifier 21, the counter 22, and the rate indicator 23 are illustrated.

The amplifier 21 operates relay 30 which actuates the totalizing counter 22 and the bubble rate indicator 23 or the indicating/recording controller 24.

The amplifier comprises a transformer 40, three 10 mfd. condensers 41, and 6C4 vacuum tube 42, the 500K sensitivity control 43, a rectifier 44, and resistors 45, 46 and 47.

The rate indicator 23 consists of 8 mfd. condenser 31, means for charging and discharging the same, and a vacuum tube voltmeter 32 for indicating the instantaneous value of the charge on the condenser 31. Each pulse from the relay 30 partially charges the condenser 31 from the 6-volt battery 34 at a rate determined by the setting of the 1 meg. variable resistor 35 in series with it. The condenser 31 is discharged at a uniform rate by a second variable resistor 36 shunting the condenser 31. As the duration of each closure pulse of the relay 30 is essentially the same, the charge on the condenser 31 is proportional to the pulse frequency. Accordingly, the instantaneous value of the charge on condenser 31, as indicated by the vacuum tube voltmeter 32, indicates the bubble rate through the flowmeter cell 13.

The invention has been described in terms of specific examples including a preferred embodiment set forth in some detail, but it should be understood that these are by way of illustration only and that the invention is not necessarily limited thereto. Alternative constructions will become apparent to those skilled in the art in view of our disclosure and, accordingly, modifications of our apparatus and operating techniques are to be contemplated without departing from the spirit of our described invention.

What we claim is:

An apparatus for continuously measuring flows of high pressure gas in the range of up to about 250 bubbles per minute which comprises in combination: a vertically elongated cell having opposed transparent walls; a gas inlet line communicating with the cell through the bottom of said cell; a nozzle means carried by said gas inlet line and discharging the gas as discrete bubbles within a lower portion of said cell, said nozzle means including a length of tubing extending upwardly through the bottom of said cell; gas outlet means at the top of said cell; means for regulating the cell back pressure near said gas outlet means; a quantity of transparent confining liquid having a relatively low vapor pressure disposed in said cell and wholly submerging the nozzle means whereby gas passing through said nozzle means issues as discrete bubbles which pass upwardly through the liquid thereabove and from the cell via the gas outlet means and cell back pressure regulating means; a light source on one side of said cell including means for directing a beam of light through said cell, said beam traversing immediately above said nozzle means; photoelectric means on the opposite side of said cell adapted to receive light from said light source passing through said cell and to deliver an output signal corresponding to each bubble, said photoelectric means being responsive to the interruption of the light beam on said photoelectric means caused by the light-scattering effect of each bubble as it issues from the nozzle means; support means carrying said light source and said photoelectric means in fixed relationship to the vertically elongated cell; an electrical counter means; and electrical circuit means including an amplifier for impressing the output signal of the photoelectric means onto said electrical counter means whereby said counter means registers a linear measure of the flow rate of gas.

References Cited in the file of this patent

UNITED STATES PATENTS

| | | |
|---|---|---|
| 2,074,950 | Wallace et al. | Mar. 23, 1937 |
| 2,078,837 | Carter | Apr. 27, 1937 |
| 2,333,791 | Hutchison | Nov. 9, 1943 |
| 2,660,886 | Milmore | Dec. 1, 1953 |
| 2,850,239 | Polanyi et al. | Sept. 2, 1958 |

FOREIGN PATENTS

| | | |
|---|---|---|
| 1,067,598 | France | Jan. 27, 1954 |